US010059833B2

(12) United States Patent
Sevignon et al.

(10) Patent No.: US 10,059,833 B2
(45) Date of Patent: Aug. 28, 2018

(54) ELASTOMER COMPOSITION HAVING A VERY GOOD DISPERSION OF THE CHARGE IN THE ELASTOMER MATRIX

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Marc Sevignon, Clermont-Ferrand (FR); Cecile Belin, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 0 days.

(21) Appl. No.: 14/351,179

(22) PCT Filed: Oct. 26, 2012

(86) PCT No.: PCT/EP2012/071280
§ 371 (c)(1),
(2) Date: Apr. 11, 2014

(87) PCT Pub. No.: WO2013/060857
PCT Pub. Date: May 2, 2013

(65) Prior Publication Data
US 2014/0256846 A1 Sep. 11, 2014

(30) Foreign Application Priority Data

Oct. 28, 2011 (FR) ...................... 11 59821

(51) Int. Cl.
*C08J 3/215* (2006.01)
*C08J 3/22* (2006.01)
*C08K 3/04* (2006.01)
*C08K 5/01* (2006.01)
*C08L 21/00* (2006.01)
*C08L 7/00* (2006.01)

(52) U.S. Cl.
CPC ................. *C08L 7/00* (2013.01); *C08J 3/215* (2013.01); *C08J 3/22* (2013.01); *C08K 3/04* (2013.01); *C08K 5/01* (2013.01); *C08L 21/00* (2013.01); *C08J 2309/00* (2013.01); *C08J 2321/00* (2013.01); *C08K 2201/006* (2013.01)

(58) Field of Classification Search
CPC . C08J 3/215; C08J 3/22; C08J 2309/00; C08J 2321/00; C08K 3/04; C08K 5/01; C08K 2201/006; C08L 21/00; C08L 7/00
USPC .......................................... 523/156; 524/495
See application file for complete search history.

(56) References Cited

U.S. PATENT DOCUMENTS

| 3,700,621 | A | 10/1972 | Burke, Jr. |
| 5,977,238 | A | 11/1999 | Labauze |
| 6,013,718 | A | 1/2000 | Cabioch et al. |
| 6,040,364 | A | 3/2000 | Mabry et al. |
| 6,048,923 | A | 4/2000 | Mabry |
| 6,075,084 | A | 6/2000 | Mabry |
| 6,503,973 | B2 | 1/2003 | Robert et al. |
| 6,774,255 | B1 | 8/2004 | Tardivat et al. |
| 6,815,473 | B2 | 11/2004 | Robert et al. |
| 2002/0086917 | A1 | 7/2002 | Chung et al. |
| 2003/0212185 | A1 | 11/2003 | Vasseur |
| 2004/0051210 | A1 | 3/2004 | Tardivat et al. |
| 2004/0092648 | A1 | 5/2004 | Jones |
| 2004/0132880 | A1 | 7/2004 | Durel et al. |
| 2004/0167705 | A1 | 8/2004 | Lingman |
| 2005/0016650 | A1 | 1/2005 | Durel et al. |
| 2005/0016651 | A1 | 1/2005 | Durel et al. |
| 2006/0089445 | A1 | 4/2006 | Gandon-Pain |
| 2006/0111475 | A1 | 5/2006 | Mabry et al. |
| 2007/0112120 | A1 | 5/2007 | Vasseur |
| 2009/0018238 | A1 | 1/2009 | Yanagisawa |
| 2009/0186961 | A1 | 7/2009 | Araujo Da Silva et al. |
| 2009/0209709 | A1 | 8/2009 | Araujo Da Silva et al. |
| 2009/0234066 | A1 | 9/2009 | Araujo Da Silva et al. |
| 2009/0308513 | A1 | 12/2009 | Ota |
| 2010/0048799 | A1 | 2/2010 | Miyazaki |
| 2010/0184912 | A1 | 7/2010 | Marechal et al. |
| 2010/0249270 | A1 | 9/2010 | Robert et al. |

(Continued)

FOREIGN PATENT DOCUMENTS

| CA | 2773920 | 3/2011 |
| CN | 1222878 | 7/1999 |

(Continued)

OTHER PUBLICATIONS

Machine Translation of JP 2011057967.*
International Search Report for PCT/EP2012/071280 dated Feb. 20, 2013.
Australian Office Action for Application No. AU2011344438 dated Feb. 10, 2015.
International Search Report on Application PCT/EP2011/072287 dated Mar. 2, 2012.
International Search Report on Application PCT/EP2012/075140 dated Feb. 20, 2013.
ASMT International "Standard Test Method for Carbon Black—Total and External Surface Area by Nitrogen Absorption", Designation: D6556-10, p. 086-1090.
Japanese Office Action for Japanese Patent Application No. 2014-537634 dated Aug. 12, 2016.
U.S. Appl. No. 13/994,192, filed Jul. 29, 2013.
U.S. Appl. No. 13/994,850, filed Aug. 12, 2013.
U.S. Appl. No. 14/364,273, filed Jun. 10, 2014.

*Primary Examiner* — Angela C Scott
(74) *Attorney, Agent, or Firm* — Dickinson Wright PLLC

(57) ABSTRACT

The invention relates to a rubber composition based on at least one diene elastomer, a reinforcing filler including at least carbon black, having a specific surface area CTAB greater than or equal to 130 m²/g, a plasticizing hydrocarbon resin, the vitreous transition temperature of which, Tg, is greater than 20° C. and the softening point of which is less than 170° C., and a cross linking system, the dispersion of the filler in the elastomeric matrix having a Z score greater than or equal to 70.

12 Claims, No Drawings

(56) References Cited

U.S. PATENT DOCUMENTS

| | | |
|---|---|---|
| 2010/0252156 A1 | 10/2010 | Robert et al. |
| 2010/0256275 A1 | 10/2010 | Lopitaux |
| 2011/0003911 A1 | 1/2011 | Yonemoto |
| 2011/0152458 A1 | 6/2011 | Araujo Da Silva et al. |
| 2012/0277344 A1 | 11/2012 | Wang et al. |

FOREIGN PATENT DOCUMENTS

| | | |
|---|---|---|
| CN | 101115785 | 1/2008 |
| CN | 101654531 | 2/2010 |
| DE | 10024613 | 11/2000 |
| EP | 0018751 | 11/1980 |
| EP | 1127909 | 8/2001 |
| EP | 1321488 | 6/2006 |
| EP | 1873191 | 11/2008 |
| FR | 2740778 | 5/1997 |
| FR | 2765882 | 1/1999 |
| GB | 744509 | 2/1956 |
| JP | 2000507892 | 6/2000 |
| JP | 2006342262 A | 12/2006 |
| JP | 2007161818 | 6/2007 |
| JP | 201013552 | 1/2010 |
| JP | 2010526924 A | 8/2010 |
| JP | 2011057967 * | 3/2011 |
| WO | 9736724 A2 | 10/1997 |
| WO | WO0192402 | 12/2001 |
| WO | WO0210269 | 2/2002 |
| WO | WO0230939 | 4/2002 |
| WO | WO0231041 | 4/2002 |
| WO | WO02083782 | 10/2002 |
| WO | WO03002648 | 1/2003 |
| WO | WO03002649 | 1/2003 |
| WO | WO03016837 | 2/2003 |
| WO | WO200496865 | 11/2004 |
| WO | WO2006125532 | 11/2006 |
| WO | WO2006125533 | 11/2006 |
| WO | WO2006125534 | 11/2006 |
| WO | WO2008141702 | 11/2008 |
| WO | WO2009000750 | 12/2008 |
| WO | WO2009000752 | 12/2008 |
| WO | 2009104555 A1 | 8/2009 |

* cited by examiner

ELASTOMER COMPOSITION HAVING A VERY GOOD DISPERSION OF THE CHARGE IN THE ELASTOMER MATRIX

This application is a 371 of PCT/EP2012/071280, filed 26 Oct. 2012, which claims benefit under 35 U.S.C. § 119 of the filing date of French patent application 1159821, filed 28 Oct. 2011, the entire contents of which is incorporated herein by reference for all purposes.

BACKGROUND

1. Field

The disclosure relates to a rubber composition in particular for a tire tread, and more particularly for a tire intended to equip vehicles carrying heavy loads and running at sustained speeds, such as lorries, tractors, trailers or buses, aircraft, etc.

2. Description of Related Art

Some current tires, referred to as "road" tires, are intended to run at high speed and over increasingly long journeys, as a result of the improvement in the road network and of the growth of the motorway network throughout the world. However, since saving fuel and the need to protect the environment have become a priority, it is important for tires to have a low energy consumption. One of the sources of energy dissipation is the heating-up of the tire.

Likewise, it is known that the treads of tires used for civil engineering are particularly sensitive to increased temperature. As it happens, an improvement in the properties of tires, and in particular their wear resistance, is continually sought and, conventionally, an improvement in wear resistance is known to be reflected by an increase in energy consumption.

In order to obtain such an improvement in wear resistance and energy consumption, it is sought to use, in the tread, reinforcing fillers which are finer, in particular "fine" carbon blacks, i.e. carbon blacks which have a CTAB specific surface area greater than or equal to 90 $m^2/g$, or even "very fine" blacks, i.e. carbon blacks having a CTAB specific surface area greater than or equal to 130 $m^2/g$. However, in order to obtain the optimum reinforcing and hysteresis properties imparted by a filler in a tire tread and thus high wear resistance and low rolling resistance, it is generally known that this filler should be present in the elastomeric matrix in a final form that is both as finely divided as possible and as uniformly distributed as possible. Such conditions can be achieved only if this filler has a very good capacity, on the one hand, to be incorporated into the matrix during the mixing with the elastomer and to deagglomerate, and, on the other hand, to disperse uniformly in this matrix.

As it happens, very fine blacks are known to be extremely difficult to correctly disperse in the elastomeric matrix and cause degradation of processability (compared with the use of less fine blacks at equal content). One solution for those skilled in the art would be the use of plasticizing oil or resin to improve processability. However, it is known that the use of such plasticizing agents results in a very considerable degradation of the energy at break properties (elongation at break and stress at break properties).

SUMMARY

The applicant has discovered, surprisingly, contrary to the knowledge of those skilled in the art, that the combination of very fine carbon blacks in rubber compositions exhibiting a very good dispersion of the filler in the elastomeric matrix, and in the presence of certain specific plasticizing resins, makes it possible both to obtain good processability without degrading the limiting properties at break.

An embodiment of the invention is thus a rubber composition based on at least one diene elastomer, a reinforcing filler comprising at least carbon black having a CTAB specific surface area greater than or equal to 130 $m^2/g$, a plasticizing hydrocarbon resin, the glass transition temperature, Tg, of which is greater than 20° C. and the softening point of which is less than 170° C., and also a crosslinking system, the dispersion of the filler in the elastomeric matrix having a Z score greater than or equal to 70.

Preferably, the plasticizing resin content of the composition ranges from 2 to 50 parts per hundred parts by weight of elastomer, preferably from 5 to 25 phr.

According to one preferential embodiment of the invention, the composition is obtained from a first masterbatch comprising at least the diene elastomer and the carbon black, and having a dispersion of the carbon black in the elastomeric matrix which has a Z score greater than or equal to 80.

According to one variant of implementation of the invention, the first masterbatch is obtained by mixing, in the liquid phase, from a diene elastomer latex and an aqueous dispersion of carbon black.

Indeed, there are various methods for obtaining a masterbatch of diene elastomer and of reinforcing filler. In particular, one type of solution consists, for improving the dispersibility of the filler in the elastomeric matrix, in mixing the elastomer and the filler in the "liquid" phase. To do this, use is made of an elastomer in the form of latex which is in the form of elastomer particles dispersed in water, and of an aqueous dispersion of the filler, i.e. a filler dispersed in water, commonly referred to as "slurry". Certain processes in particular, such as those described in document U.S. Pat. No. 6,048,923, make it possible to obtain a masterbatch of elastomer and of filler exhibiting a very good dispersion of the filler in the elastomeric matrix, greatly improved compared with the dispersion of the filler in the elastomeric matrix capable of being obtained when elastomer and reinforcing filler are mixed in the solid phase. This process consists in particular in incorporating a continuous stream of a first fluid made up of an elastomer latex in the mixing zone of a coagulation reactor, in incorporating a second continuous stream of a second fluid made up of an aqueous dispersion of filler under pressure in the mixing zone so as to form a mixture with the elastomer latex, the mixing of these two fluids being sufficiently energetic to make it possible to virtually completely coagulate the elastomer latex with the filler before the outlet orifice of the coagulation reactor, and then in drying the coagulum obtained.

An embodiment of the invention is also a composition based on at least one diene elastomer, a reinforcing filler comprising at least carbon black having a CTAB specific surface area greater than or equal to 130 $m^2/g$, a plasticizing hydrocarbon resin, the glass transition temperature, Tg, of which is greater than 20° C. and the softening point of which is less than 170° C., and also a crosslinking system, obtained from a first masterbatch comprising at least the diene elastomer and the carbon black, and exhibiting a dispersion of the carbon black in the elastomeric matrix which has a Z score greater than or equal to 80.

Preferably, the plasticizing resin content of the composition ranges from 2 to 50 parts per hundred parts by weight of elastomer, preferably from 5 to 25 phr.

According to one preferential embodiment of the invention, the composition is obtained from a first masterbatch comprising at least the diene elastomer and the carbon black, and exhibiting a dispersion of the carbon black in the elastomeric matrix which has a Z score greater than or equal to 80.

According to one variant of implementation of the invention, the first masterbatch is obtained by mixing, in the liquid phase, from a diene elastomer latex and an aqueous dispersion of carbon black, preferably identical to the liquid-phase process detailed previously.

An embodiment of the invention also relates to a process for preparing a composition comprising at least one diene elastomer, a reinforcing filler comprising at least carbon black having a CTAB specific surface area greater than or equal to 130 m$^2$/g, a plasticizing hydrocarbon resin, the glass transition temperature, Tg, of which is greater than 20° C. and the softening point of which is less than 170° C., and also a crosslinking system, the dispersion of the filler in the elastomeric matrix having a Z score greater than or equal to 70, which comprises the following steps:
  incorporation of all of the constituents of the composition, with the exception of the crosslinking system, in a mixer by thermomechanically kneading the whole mixture until a maximum temperature of between 130° C. and 200° C. is reached,
  cooling of the whole mixture to a temperature of less than 100° C.,
  subsequent incorporation of the crosslinking system,
  kneading of the whole mixture until a maximum temperature of less than 120° C. is reached.

Preferably, a first masterbatch comprising at least the diene elastomer and the carbon black, and exhibiting a dispersion of the carbon black in the elastomeric matrix which has a Z score greater than or equal to 80, is prepared prior to the incorporation of all of the constituents of the composition in the mixer.

Even more preferentially, the masterbatch is prepared in the liquid phase from at least one elastomer latex and a dispersion of carbon black, in particular according to the process detailed previously.

An embodiment of the invention also relates to a process for preparing a composition comprising at least one diene elastomer, a reinforcing filler comprising at least carbon black having a CTAB specific surface area greater than or equal to 130 m$^2$/g, a plasticizing hydrocarbon resin, the glass transition temperature, Tg, of which is greater than 20° C. and the softening point of which is less than 170° C., and also a crosslinking system, which comprises the following steps:
  preparation of a first masterbatch comprising the diene elastomer and the carbon black, this first masterbatch exhibiting a dispersion of the filler in the elastomeric matrix which has a Z score greater than or equal to 80,
  incorporation of the other constituents of the composition, with the exception of the crosslinking system, into the first masterbatch in a mixer by thermomechanically kneading the whole mixture until a maximum temperature of between 130° C. and 200° C. is reached,
  cooling of the whole mixture to a temperature of less than 100° C.,
  subsequent incorporation of the crosslinking system,
  kneading of the whole mixture until a maximum temperature of less than 120° C. is reached.

Preferably, the masterbatch is prepared in the liquid phase from at least one elastomer latex and a dispersion of carbon black, in particular according to the process detailed previously.

An embodiment of the invention also relates to a masterbatch based on at least one diene elastomer, a reinforcing filler comprising at least carbon black having a CTAB specific surface area greater than or equal to 130 m$^2$/g, a plasticizing hydrocarbon resin, the glass transition temperature, Tg, of which is greater than 20° C. and the softening point of which is less than 170° C., the dispersion of the filler in the elastomeric matrix having a Z score greater than or equal to 70.

Preferably, this masterbatch is obtained from a first masterbatch comprising at least the diene elastomer and the carbon black, and exhibiting a dispersion of the carbon black in the elastomeric matrix which has a Z score greater than or equal to 80.

Even more preferentially, this first masterbatch is prepared in the liquid phase from at least one elastomer latex and a dispersion of carbon black, in particular according to the process detailed previously.

An embodiment of the invention also relates to a masterbatch based on at least one diene elastomer, a reinforcing filler comprising at least carbon black having a CTAB specific surface area greater than or equal to 130 m$^2$/g, a plasticizing hydrocarbon resin, the glass transition temperature, Tg, of which is greater than 20° C. and the softening point of which is less than 170° C., obtained from a first masterbatch comprising at least the diene elastomer and the carbon black, and exhibiting a dispersion of the carbon black in the elastomeric matrix which has a Z score greater than or equal to 80.

Preferably, this first masterbatch is prepared in the liquid phase from at least one elastomer latex and a dispersion of carbon black, in particular according to the process detailed previously.

Finally, an embodiment of the invention is a finished or semi-finished article, a tire tread, a tire and a semi-finished product comprising a composition as described previously or a masterbatch as described previously.

In what follows, the term "masterbatch" is intended to mean an elastomer-based composite into which a filler and optionally other additives have been introduced.

DETAILED DESCRIPTION OF SPECIFIC EMBODIMENTS

Measurements and Tests

The rubber compositions are characterized, before and after curing, as indicated hereinafter.

Mooney Plasticity

Use is made of an oscillating consistometer as described in the French standard NF T 43-005 (1991). The Mooney plasticity measurement is carried out according to the following principle: the composition in the uncured state (i.e. before curing) is moulded in a cylindrical chamber heated to 100° C. After preheating for one minute, the (small-sized) rotor rotates within the test specimen at 2 rpm and the working torque for maintaining this movement is measured after rotating for 4 minutes. The Mooney plasticity (MS 1+4) is expressed in "Mooney units" (MU, with 1 MU=0.83 Newton.meter).

Dispersion

As is known, the dispersion of filler in an elastomeric matrix can be represented by the Z score, which is measured, after crosslinking, according to the method described by S. Otto et al. in Kautschuk Gummi Kunststoffe, 58th edition, NR 7-82005, in accordance with the standard ISO 11345.

The calculation of the Z score is based on the percentage of surface area in which the filler is not dispersed ("% undispersed surface area"), as measured by the "disper-GRADER+" machine provided with its operating instructions and its "disperDATA" operating software by the company Dynisco, according to the equation:

Z=100−(% undispersed surface area)/0.35

The percentage of undispersed surface area is, for its part, measured by a camera that observes the surface area of the sample under incident light at 30°. The light points are associated with filler and agglomerates, while the dark points are associated with the rubber matrix; digital processing converts the image into a black and white image, and enables the determination of the percentage of undispersed surface area, as described by S. Otto in the abovementioned document.

The higher the Z score, the better the dispersion of the filler in the elastomeric matrix (a Z score of 100 corresponding to a perfect dispersion and a Z score of 0 to a mediocre dispersion). A Z score greater than or equal to 80 will be considered to correspond to a surface area having a very good dispersion of the filler in the elastomeric matrix.

Tensile Tests

These tensile tests make it possible to determine the elasticity stresses and the properties at break. Unless otherwise indicated, they are carried out in accordance with the French standard NF T 46-002 of September 1988. At first elongation (i.e. after an accommodation cycle at the extension rate provided for the measurement itself), the nominal secant modulus (or apparent stress, in MPa) is measured at 100% elongation (denoted MA100). The tensile measurements for determining the secant accommodated moduli are carried out at a temperature of 23° C.+/−2° C., and under standard hygrometry conditions (50+/−5% relative humidity).

The stress at breaks (in MPa) and the elongations at break (in %) are also measured. All these tensile measurements are carried out at a temperature of 60° C.±2° C., and under standard hygrometry conditions (50±5% relative humidity), according to the French standard NF T 40-101 (December 1979).

The energy at break is the product of the stress at break and the elongation at break.

Dynamic Properties

The dynamic properties and in particular $\tan(\delta)_{max}$, representative of the hysteresis, are measured on a viscosity analyser (Metravib VA4000), according to the standard ASTM D 5992-96. The response of a sample of vulcanized composition (cylindrical test specimen with a thickness of 4 mm and a cross section of 400 mm$^2$), subjected to a simple alternating sinusoidal shear stress, at a frequency of 10 Hz, is recorded under standard temperature conditions (23° C.) according to the standard ASTM D 1349-99, or, as appropriate, at a different temperature; in particular, in the examples cited, the measurement temperature is 60° C. A peak-to-peak strain amplitude sweep is carried out from 0.1% to 50% (forward cycle) and then from 50% to 0.1% (return cycle). The results of which use is made are the complex dynamic shear modulus (G*) and the loss factor $\tan(\delta)$. For the return cycle, the maximum value of $\tan(\delta)$ observed, denoted $\tan(\delta)_{max}$, is noted.

The invention relates to a composition based on at least one diene elastomer, a reinforcing filler comprising at least carbon black having a CTAB specific surface area greater than or equal to 130 m$^2$/g, a plasticizing hydrocarbon resin, the glass transition temperature, Tg, of which is greater than 20° C. and the softening point of which is less than 170° C., and also a crosslinking system, the dispersion of the filler in the elastomeric matrix having a Z score greater than or equal to 70.

According to one embodiment of the invention, this composition is obtained from a first masterbatch comprising at least the diene elastomer and the carbon black, and exhibiting a dispersion of the black of 80.

In the present description, unless otherwise expressly indicated, all the percentages (%) indicated are % by weight. Furthermore, any range of values denoted by the expression "between a and b" represents the range of values from more than a to less than b (i.e. limits a and b excluded), whereas any range of values denoted by the expression "from a to b" signifies the range of values from a up to b (i.e. including the strict limits a and b).

Diene Elastomer

In a normal manner, the terms "elastomer" and "rubber", which are interchangeable, are used without distinction in the text.

The composition in accordance with the invention comprises at least one first diene elastomer and optionally a second elastomer identical to or different from the first, which may or may not therefore be a diene elastomer.

The term "diene" elastomer or rubber should be understood to mean, in a known manner, an elastomer resulting at least partly (i.e. a homopolymer or a copolymer) from diene monomers (monomers bearing two conjugated or unconjugated, carbon-carbon double bonds).

These diene elastomers can be classified into two categories: "essentially unsaturated" or "essentially saturated". The term "essentially unsaturated" is generally intended to mean a diene elastomer resulting at least partly from conjugated diene monomers having a content of units of diene origin (conjugated dienes) which is greater than 15% (mol %); thus, diene elastomers such as butyl rubbers or copolymers of dienes and of alpha-olefins of EPDM type do not fall within the above definition and can in particular be described as "essentially saturated" diene elastomers (low or very low content of units of diene origin, always less than 15%). In the category of "essentially unsaturated" diene elastomers, the term "highly unsaturated" diene elastomer is intended to mean in particular a diene elastomer having a content of units of diene origin (conjugated dienes) which is greater than 50%.

Among these diene elastomers, natural rubber and synthetic elastomers are, moreover, distinguished.

The expression "synthetic diene elastomers capable of being used in accordance with the invention" is intended to mean more particularly, in terms of the expression "diene elastomer":

(a)—any homopolymer obtained by polymerization of a conjugated diene monomer having from 4 to 12 carbon atoms;

(b)—any copolymer obtained by copolymerization of one or more conjugated dienes with one another or with one or more aromatic vinyl compounds having from 8 to 20 carbon atoms;

(c)—a ternary copolymer obtained by copolymerization of ethylene and of an α-olefin having 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene;

(d)—a copolymer of isobutene and of isoprene (butyl rubber) and also the halogenated versions, in particular chlorinated or brominated versions, of this type of copolymer.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The copolymers can contain between 99% and 20% by weight of diene units and between 1% and 80% by weight of vinylaromatic units. The elastomers can have any microstructure, which depends on the polymerization conditions used, in particular on the presence or absence of a modifying and/or randomizing agent and on the amounts of modifying and/or randomizing agent employed. The elastomers can, for example, be block, random, sequential or microsequential elastomers, and can be prepared in dispersion or in solution; they can be coupled and/or star-branched or else functionalized with a coupling and/or star-branching or functionalization agent. For coupling to carbon black, mention may be made, for example, of functional groups comprising a C—Sn bond or aminated functional groups, such as aminobenzophenone, for example; for coupling to an inorganic filler such as silica, mention may be made, for example, of silanol functional groups or polysiloxane functional groups having a silanol end (as described, for example, in FR 2 740 778 or U.S. Pat. No. 6,013,718, and WO 2008/41702), alkoxysilane groups (as described, for example, in FR 2 765 882 or U.S. Pat. No. 5,977,238), carboxylic groups (as described, for example, in WO 0192402 or U.S. Pat. No. 6,815,473, WO 2004/096865 or US 2006/0089445) or else polyether groups (as described, for example, in EP 1 127 909 or U.S. Pat. No. 6,503,973, WO 2009/000750 and WO 2009/000752). As other examples of functionalized elastomers, mention may also be made of elastomers (such as SBR, BR, NR or IR) of the epoxidized type.

The following are suitable: polybutadienes and in particular those having a content (mol %) of 1,2- units of between 4% and 80% or those having a content (mol %) of cis-1,4-units of greater than 80%, polyisoprenes, butadiene/styrene copolymers and in particular those having a Tg (glass transition temperature (Tg), measured according to ASTM D3418) of between 0° C. and −70° C. and more particularly between −10° C. and −60° C., a styrene content of between 5% and 60% by weight and more particularly between 20% and 50%, a content (mol %) of 1,2-bonds of the butadiene part of between 4% and 75%, and a content (mol %) of trans-1,4-bonds of between 10% and 80%, butadiene/isoprene copolymers and in particular those having an isoprene content of between 5% and 90% by weight and a Tg of −40° C. to −80° C., and isoprene/styrene copolymers and in particular those having a styrene content of between 5% and 50% by weight and a Tg of between −5° C. and −50° C. In the case of butadiene/styrene/isoprene copolymers, those having a styrene content of between 5% and 50% by weight and more particularly between 10% and 40%, an isoprene content of between 15% and 60% by weight and more particularly between 20% and 50%, a butadiene content of between 5% and 50% by weight and more particularly between 20% and 40%, a content (mol %) of 1,2-units of the butadiene part of between 4% and 85%, a content (mol %) of trans-1,4-units of the butadiene part of between 6% and 80%, a content (mol %) of 1,2-plus 3,4-units of the isoprene part of between 5% and 70% and a content (mol %) of trans-1,4-units of the isoprene part of between 10% and 50%, and more particularly any butadiene/styrene/isoprene copolymer having a Tg of between −5° C. and −70° C., are in particular suitable.

To summarize, the synthetic diene elastomer(s) according to the invention is (are) preferably selected from the group of highly unsaturated diene elastomers consisting of polybutadienes (abbreviated to "BRs"), synthetic polyisoprenes (IRs), butadiene copolymers, isoprene copolymers and blends of these elastomers. Such copolymers are more preferentially selected from the group consisting of butadiene/styrene copolymers (SBRs), isoprene/butadiene copolymers (BIRs), isoprene/styrene copolymers (SIRs) and isoprene/butadiene/styrene copolymers (SBIRs).

As has been specified above, processes for mixing in the liquid phase are preferentially used to make it possible to obtain masterbatches based on diene elastomer and carbon black having a very good dispersion of the carbon black in the elastomer. Thus, in particular for preparing the first masterbatch of diene elastomer and carbon black, use will more particularly be made of a diene elastomer latex, the elastomer latex being a particular form of the elastomer which is in the form of elastomer particles dispersed in water.

The invention therefore preferentially relates to the latexes of diene elastomers, the diene elastomers being those defined previously.

More particularly, for the natural rubber (NR) which is particularly suitable for the invention, this natural rubber exists in various forms as detailed in chapter 3 "Latex concentrates: properties and composition" by K. F. Gaseley, A. D. T. Gordon and T. D. Pendle in "Natural Rubber Science and Technology", A. D. Roberts, Oxford University Press—1988.

In particular, several forms of natural rubber latex are sold: the natural rubber latexes referred to as "field latexes", the natural rubber latexes referred to as "concentrated natural rubber latexes", epoxidized latexes (ENR), deproteinized latexes or else prevulcanized latexes. The natural rubber field latex is a latex in which ammonia has been added to prevent premature coagulation and the concentrated natural rubber latex corresponds to a field latex that has undergone a treatment corresponding to a washing followed by a further concentration. The various categories of concentrated natural rubber latexes are listed in particular according to the standard ASTM D 1076-06. Distinguished in particular from among these concentrated natural rubber latexes are the concentrated natural rubber latexes of "HA" (high ammonia) quality and of "LA" quality; for the invention, use will advantageously be made of concentrated natural rubber latexes of HA quality.

The NR latex may be physically or chemically modified beforehand (centrifugation, enzymatic treatment, chemically modified, etc.).

The latex may be used directly or may be first diluted in water to facilitate the processing thereof.

Thus, as synthetic elastomer latex, the latex may in particular consist of a synthetic diene elastomer already available in the form of an emulsion (for example a copolymer of butadiene and of styrene, SBR, prepared in emulsion) or of a synthetic diene elastomer initially in solution (for example an SBR prepared in solution), which is emulsified in a mixture of organic solvent and water, generally by means of a surfactant.

Particularly suitable for the invention is an SBR latex, in particular an SBR prepared in emulsion (ESBR) or an SBR prepared in solution (SSBR), and more particularly an SBR prepared in emulsion.

There are two main types of processes for emulsion copolymerization of styrene and butadiene, one of them, or the hot process (carried out at a temperature close to 50° C.), being suitable for the preparation of highly branched SBRs whereas the other, or the cold process (carried out at a temperature which may range from 15° C. to 40° C.), makes it possible to obtain more linear SBRs.

For a detailed description of the effectiveness of several emulsifiers that can be used in said hot process (as a function of the contents of said emulsifiers), reference may, for example, be made to the two articles by C. W. Carr, 1. M. Kolthoff, E. J. Meehan, University of Minnesota, Minneapolis, Minn. which were published in Journal of Polymer Science of 1950, Vol. V, no 2, pp. 201-206, and of 1951, Vol. VI, no 1, pp. 73-81.

Regarding comparative examples of the implementation of said cold process, reference may, for example, be made to the article ½Industrial and Engineering Chemistry, 1948, Vol. 40, no 5, pp. 932-937, E. J. Vandenberg, G. E. Hulse, Hercules Powder Company, Wilmington, Del. + and to the article ½ Industrial and Engineering Chemistry, 1954, Vol. 46, no 5, pp. 1065-1073, J. R. Miller, H. E. Diem, B. F. Goodrich Chemical Co., Akron, Ohio+.

In the case of an SBR elastomer (ESBR or SSBR), use is in particular made of an SBR having an average styrene content, for example of between 20% and 35% by weight, or a high styrene content, for example from 35% to 45%, a content of vinyl bonds of the butadiene part of between 15% and 70%, a content (mol %) of trans-1,4-bonds of between 15% and 75% and a Tg of between −10° C. and −55° C.; such an SBR may be advantageously used as a blend with a BR that preferably has more than 90% (mol %) of cis-1,4-bonds.

It will be noted that it is possible to envisage using one or more natural rubber latexes as a blend, or one or more synthetic rubber latexes as a blend, or a blend of one or more natural rubber latexes with one or more synthetic rubber latexes.

As the second elastomer of the composition, where appropriate, when it is not a diene elastomer, non-diene butyl elastomers such as poly(isobutylene) homopolymers or poly(isobutylene)-based copolymers (of course, if copolymers with isoprene are involved, it is a question of the diene elastomers previously described), and also the halogenated derivatives, in particular generally brominated or chlorinated derivatives, of these poly(isobutylene) homopolymers and poly(isobutylene)-based copolymers, are in particular suitable.

Also suitable among the non-diene elastomers are copolymers of isobutylene and of styrene derivatives, such as brominated isobutylene/methylstyrene copolymers (BIMSs), one of which is in particular the elastomer called EXXPRO, sold by the company Exxon. As non-diene elastomer particularly suitable for the invention, mention may also be made of non-diene thermoplastic elastomers (TPEs).

Advantageously, the weight fraction of the first diene elastomer in the elastomeric matrix is greater than or equal to 50% and preferably greater than or equal to 60%.

Fillers

An organic filler consisting of carbon black is used as reinforcing filler. All reinforcing carbon blacks having a CTAB specific surface area greater than or equal to 130 m$^2$/g, and even more particularly carbon blacks having a CTAB surface area greater than or equal to 160 m$^2$/g, are suitable as carbon blacks.

It should be specified that the CTAB specific surface area is determined according to the French standard NF T 45-007 of November 1987 (method B).

It is possible to combine with this carbon black, as a blend, one or more organic fillers, such as, for example, functionalized polyvinylaromatic organic fillers, as described in applications WO-A-2006/069792 and WO-A-2006/069793, and/or one or more reinforcing inorganic fillers such as silica.

Thus, the term "inorganic filler" should be understood here, in a known manner, to mean any inorganic or mineral filler, whatever its colour and its origin (natural or synthetic), also referred to as "white filler", "clear filler" or alternatively "non-black filler" as opposed to carbon black, this inorganic filler being capable of reinforcing, by itself, without means other than an intermediate coupling agent, a rubber composition intended for the manufacture of a tread for tires, in other words capable of replacing, in its reinforcing role, a conventional tire-grade carbon black for a tread. Such a filler is generally characterized by the presence of functional groups, in particular hydroxyl (—OH) groups, at its surface, requiring, in order to be used as a reinforcing filler, the use of a coupling agent or system intended to provide a stable chemical bond between the isoprene elastomer and said filler.

Such an inorganic filler can therefore be used with a coupling agent in order to enable the reinforcement of the rubber composition in which it is included. It can also be used with a covering agent (which does not provide a bond between the filler and the elastomeric matrix) in addition to a coupling agent or not (in this case the inorganic filler does not play a reinforcing role).

The physical state in which the inorganic filler is present is not important, whether it is in the form of a powder, of microbeads, of granules, of balls or any other appropriate densified form. Of course, the term "inorganic filler" is also intended to mean mixtures of various inorganic fillers, in particular highly dispersible siliceous and/or aluminous fillers as described hereinafter.

Mineral fillers of the siliceous type, in particular silica (SiO$_2$), or of the aluminous type, in particular alumina (Al$_2$O$_3$), are suitable in particular as inorganic fillers. The silica used may be any silica known to those skilled in the art, in particular any precipitated or fumed silica having a BET specific surface area and also a CTAB specific surface area that are both less than 450 m$^2$/g, preferably from 30 to 400 m$^2$/g. Mention will be made, as highly dispersible precipitated silicas (HDSs), for example, of the Ultrasil 7000 and Ultrasil 7005 silicas from the company Evonik, the Zeosil 1165 MP, 1135 MP and 1115 MP silicas from the company Rhodia, the Hi-Sil EZ150G silica from the company PPG, the Zeopol 8715, 8745 and 8755 silicas from the company Huber, and the silicas with a high specific surface area as described in application WO 03/16837.

It is also possible to envisage the addition, to the carbon black, of fillers such as carbon blacks partially or completely covered with silica by a post-treatment, or carbon blacks modified in situ with silica, such as, with no implied limitation, the fillers which are sold by the company Cabot Corporation under the name Ecoblack™ "CRX 2000" or "CRX4000".

Preferentially, the content of total filler (carbon black and inorganic filler such as silica) is between 20 and 200 phr, more preferentially between 30 and 150 phr and even more preferentially between 30 and 100 phr, the optimum being, in a known manner, different depending on the particular applications targeted: the level of reinforcement expected on a bicycle tire, for example, is of course less than that required on a tire capable of running at high speed in a sustained manner, for example a motorcycle tire, or a tire for a passenger vehicle or for a utility vehicle such as a heavy goods vehicle.

According to one preferential embodiment of the invention, use is made of carbon black of which the content ranges from 20 to 80 phr, and it can preferably be combined with an inorganic filler, in particular silica, the content of which ranges from 5 to 50 phr, more particularly the total filler of the composition comprising carbon black of which the content ranges from 35 to 70 phr and an inorganic filler, in particular silica, of which the content ranges from 5 to 35 phr, even more preferentially the total filler comprising carbon black of which the content ranges from 40 to 65 phr and an inorganic filler, in particular silica, of which the content ranges from 10 to 30 phr.

Plasticizing Hydrocarbon Resin

The rubber compositions of the invention use a plasticizing hydrocarbon resin of which the Tg, glass transition temperature, is greater than 20° C. and of which the softening point is less than 170° C., as explained in detail hereinafter.

In a manner known to those skilled in the art, the name "plasticizing resin" is reserved in the present application, by definition, for a compound which is, on the one hand, solid at ambient temperature (23° C.) (as opposed to a liquid plasticizing compound such as an oil), and, on the other hand, compatible (i.e. miscible at the content used, typically greater than 5 phr) with the rubber composition for which it is intended, so as to act as an actual diluting agent.

The hydrocarbon resins are polymers well known to those skilled in the art, miscible therefore by nature in the compositions of elastomer(s) when they are additionally described as "plasticizing".

They have been widely described in the patents or patent applications cited in the introduction of the present report, and also, for example, in the book entitled "Hydrocarbon Resins" by R. Mildenberg, M. Zander and G. Collin (New York, VCH, 1997, ISBN 3-527-28617-9), chapter 5 of which is devoted to their applications, in particular in the tire rubber field (5.5. "Rubber Tires and Mechanical Goods").

They can be aliphatic, naphthenic, aromatic or else of the aliphatic/naphthenic/aromatic type, i.e. based on aliphatic and/or naphthenic and/or aromatic monomers. They can be natural or synthetic, based or not based on petroleum (if such is the case, also known as petroleum resins). They are preferentially exclusively hydrocarbon-based, i.e. they comprise only hydrogen and carbon atoms.

Preferably, the plasticizing hydrocarbon resin has at least one, more preferentially all, of the following characteristics:
 a number-average molecular weight (Mn) of between 400 and 2000 g/mol;
 a polydispersity index (PI) of less than 3 (as a reminder: PI=Mw/Mn with Mw being the weight-average molecular weight).

More preferentially, this plasticizing hydrocarbon resin has at least one, even more preferentially all, of the following characteristics:
 a Tg of greater than 30° C.;
 a weight Mn of between 500 and 1500 g/mol;
 a PI index of less than 2.

The glass transition temperature Tg is measured in a known manner by DSC (Differential Scanning calorimetry), according to the standard ASTM D3418 (1999), and the softening point is measured according to the standard ASTM E-28.

The macrostructure (Mw, Mn and PI) of the hydrocarbon resin is determined by size exclusion chromatography (SEC): solvent tetrahydrofuran; temperature 35° C.; concentration 1 g/l; flow rate 1 ml/min; solution filtered on a filter with a porosity of 0.45 µm before injection; Moore calibration with polystyrene standards; set of 3 "WATERS" columns in series ("STYRAGEL" HR4E, HR1 and HR0.5); detection by differential refractometer ("WATERS 2410") and its associated exploitation software ("WATERS EMPOWER").

According to one particularly preferential embodiment, the plasticizing hydrocarbon resin is selected from the group consisting of cyclopentadiene (abbreviated to CPD) or dicyclopentadiene (abbreviated to DCPD) homopolymer or copolymer resins, terpene homopolymer or copolymer resins, C5 fraction homopolymer or copolymer resins, and mixtures of these resins.

Among the above copolymer resins, use is preferentially made of those selected from the group consisting of (D)CPD/vinylaromatic copolymer resins, (D)CPD/terpene copolymer resins, (D)CPD/C5 fraction copolymer resins, terpene/vinylaromatic copolymer resins, C5 fraction/vinylaromatic copolymer resins, and mixtures of these resins.

The term "terpene" combines here, in a known manner, alpha-pinene, beta-pinene and limonene monomers; use is preferentially made of a limonene monomer, which compound exists, in a known manner, in the form of three possible isomers: L-limonene (levorotatory enantiomer), D-limonene (dextrorotatory enantiomer), or else dipentene, a racemate of the dextrorotatory and levorotatory enantiomers.

Suitable as a vinylaromatic monomer are, for example, styrene, alpha-methylstyrene, ortho-methylstyrene, meta-methylstyrene, para-methylstyrene, vinyltoluene, para-(tert-butyl)styrene, methoxystyrenes, chlorostyrenes, vinylmesitylene, divinylbenzene, vinylnaphthalene or any vinylaromatic monomer resulting from a $C_9$ fraction (or more generally from a $C_8$ to $C_{10}$ fraction). Preferably, the vinylaromatic compound is styrene or a vinylaromatic monomer resulting from a $C_9$ fraction (or more generally from a $C_8$ to $C_{10}$ fraction). Preferably, the vinylaromatic compound is the minor monomer, expressed as molar fraction, in the copolymer under consideration.

According to one more particularly preferential embodiment, the plasticizing hydrocarbon resin is selected from the group consisting of (D)CPD homopolymer resins, (D)CPD/styrene copolymer resins, polylimonene resins, limonene/styrene copolymer resins, limonene/(D)CPD copolymer resins, C5 fraction/styrene copolymer resins, C5 fraction/C9 fraction copolymer resins, and mixtures of these resins.

The preferential resins above are well known to those skilled in the art and are commercially available, for example sold, as regards the:
 polylimonene resins: by the company DRT under the name "Dercolyte L120" (Mn=625 g/mol; Mw=1010 g/mol; PI=1.6; Tg=72° C.) or by the company Arizona under the name "Sylvagum TR7125C" (Mn=630 g/mol; Mw=950 g/mol; PI=1.5; Tg=70° C.);
 $C_5$ fraction/vinylaromatic, in particular $C_5$ fraction/styrene or $C_5$ fraction/$C_9$ fraction, copolymer resins: by Neville Chemical Company under the names "Super Nevtac 78", "Super Nevtac 85" or "Super Nevtac 99", by Goodyear Chemicals under the name "Wingtack Extra", by Kolon under the names "Hikorez T1095"

and "Hikorez T1100", or by Exxon under the names "Escorez 2101" and "ECR 373";

limonene/styrene copolymer resins: by DRT under the name "Dercolyte TS 105", or by Arizona Chemical Company under the names "ZT115LT" and "ZT5100".

The content of hydrocarbon resin is preferentially between 2 and 35 phr. Below the minimum indicated, the technical effect targeted may prove to be insufficient, whereas above the maximum, the bonding power of the compositions in the uncured state, on the mixing tools, may in certain cases become totally unacceptable from an industrial point of view. The content of hydrocarbon resin is even more preferentially between 5 and 25 phr.

Masterbatches—Rubber Composition

Advantageously, the masterbatches and the compositions thus produced are capable of being used in tire applications.

The rubber compositions for tires based on masterbatches and inorganic filler according to the invention may also comprise, in a known manner, a coupling agent and/or a covering agent and a vulcanization system.

In order to couple the reinforcing inorganic filler to the diene elastomer, use is made, in a known manner, of an at least bifunctional coupling agent (or bonding agent) intended to provide a sufficient connection, of chemical and/or physical nature, between the inorganic filler (surface of its particles) and the diene elastomer, in particular bifunctional organosilanes or polyorganosiloxanes.

Use is in particular made of silane polysulphides, referred to as "symmetrical" or "asymmetrical" depending on their specific structure, as described, for example, in applications WO 03/002648 (or US 2005/016651) and WO 03/002649 (or US 2005/016650).

Suitable in particular, without the definition hereinafter being limiting, are silane polysulphides, referred to as "symmetrical", corresponding to the following general formula (III):

$$Z\text{-}A\text{-}S_x\text{-}A\text{-}Z, \text{ in which:} \quad (III)$$

x is an integer from 2 to 8 (preferably from 2 to 5);
A is a divalent hydrocarbon radical (preferably $C_1$-$C_{18}$ alkylene groups or $C_6$-$C_{12}$ arylene groups, more particularly $C_1$-$C_{10}$, especially $C_1$-$C_4$, alkylenes, in particular propylene);
Z corresponds to one of the formulae hereinafter:

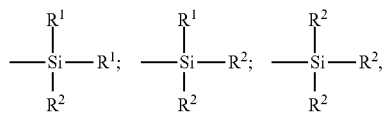

in which:
the $R^1$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group (preferably $C_1$-$C_6$ alkyl, cyclohexyl or phenyl groups, in particular $C_1$-$C_4$ alkyl groups, more particularly methyl and/or ethyl);
the $R^2$ radicals, which are substituted or unsubstituted and identical to or different from one another, represent a $C_1$-$C_{18}$ alkoxyl group or a $C_5$-$C_{18}$ cycloalkoxyl group (preferably a group selected from $C_1$-$C_8$ alkoxyls and $C_5$-$C_8$ cycloalkoxyls, even more preferentially a group selected from $C_1$-$C_4$ alkoxyls, in particular methoxyl and ethoxyl).

In the case of a mixture of alkoxysilane polysulphides corresponding to formula (III) above, in particular the usual commercially available mixtures, the mean value of the "x" subscripts is a fractional number preferably between 2 and 5, more preferentially close to 4. However, the invention may also advantageously be carried out, for example, with alkoxysilane disulphides (x=2).

As examples of silane polysulphides, mention will more particularly be made of bis(($C_1$-$C_4$)alkoxyl($C_1$-$C_4$)alkylsilyl ($C_1$-$C_4$)alkyl)polysulphides (in particular disulphides, trisulphides or tetrasulphides), such as, for example, bis(3-trimethoxysilylpropyl) or bis(3-triethoxysilylpropyl) polysulphides. Among these compounds, use is in particular made of bis(3-triethoxysilylpropyl)tetrasulphide, abbreviated to TESPT, of formula $[(C_2H_5O)_3Si(CH_2)_3S_2]_2$ or bis(triethoxysilylpropyl)disulphide, abbreviated to TESPD, of formula $[(C_2H_5O)_3Si(CH_2)_3S]_2$. Mention will also be made, as preferential examples, of bis(mono($C_1$-$C_4$)alkoxydi($C_1$-$C_4$)alkylsilylpropyl)polysulphides (in particular disulphides, trisulphides or tetrasulphides), more particularly bis(monoethoxydimethyl-silylpropyl)tetrasulphide as described in patent application WO 02/083782 (or US 2004/132880).

As coupling agents other than an alkoxysilane polysulphide, mention will in particular be made of bifunctional POSs (polyorganosiloxanes) or else of hydroxysilane polysulphides ($R^2$=OH in formula III above), as described in patent applications WO 0230939 (or U.S. Pat. No. 6,774,255) and WO 02/31041 (or US 2004/051210), or else silanes or POSs bearing azodicarbonyl functional groups, as described, for example, in patent applications WO 2006/125532, WO 2006/125533, and WO 2006/125534.

As covering agents, consideration will generally be given to processing aids that are capable, in a known manner, owing to an improvement in the dispersion of the inorganic filler in the rubber matrix and a lowering of the viscosity of the compositions, of improving their ability to process in the uncured state, these processing aids being, for example, hydrolysable silanes, such as alkylalkoxysilanes (in particular alkyltriethoxysilanes), polyols, polyethers (for example polyethylene glycols), primary, secondary or tertiary amines (for example trialkanolamines), hydroxylated or hydrolysable POSs, for example α,ω-dihydroxypolyorganosiloxanes (in particular α,ω-dihydroxypolydimethylsiloxanes), and fatty acids such as, for example, stearic acid.

In the rubber compositions in accordance with the invention, the content of coupling agent is preferentially between 0.1% and 12% by weight of the inorganic filler for a CTAB surface area of 160 m²/g, more preferentially between 4% and 10% by weight of the inorganic filler for a CTAB surface area of 160 m²/g; and/or the content of covering agent is preferentially between 0.1% and 20% by weight of the inorganic filler for a CTAB surface area of 160 m²/g, more preferentially between 5% and 20% by weight of the inorganic filler for a CTAB surface area of 160 m²/g. It is possible for the content of coupling agent to be adjusted to the specific surface area level of the filler.

Those skilled in the art will understand that a filler of another nature, in particular organic nature, might be used as filler equivalent to the inorganic filler described in the present section, provided that this filler is covered with an inorganic layer, such as silica, or else comprises, at its surface, functional sites, in particular hydroxyls, requiring the use of a coupling agent in order to form the connection between the filler and the elastomer.

These rubber compositions in accordance with the invention may also comprise all or some of the standard additives customarily used in elastomeric compositions intended for the manufacture of tires, in particular treads, such as, for example, other plasticizers, pigments, protective agents such as antiozone waxes, chemical antiozonants, antioxidants, anti-fatigue agents, reinforcing resins, methylene acceptors (for example phenolic-novolac resin) or methylene donors (for example HMT or H3M) as described, for example, in application WO 02/10269, a crosslinking system based either on sulphur or on sulphur donors, and/or on a peroxide and/or on bismaleimides, and vulcanization accelerators.

It will be noted that it is also possible to envisage producing the masterbatches in accordance with the invention by incorporating therein, in particular before the drying phase of the production of the masterbatch in the liquid phase, additives as described previously, antioxidant, coupling agent, covering agent, etc.

Manufacture of the Rubber Compositions and Masterbatches

The rubber compositions of the invention are manufactured in appropriate mixers, using two successive phases of preparation according to a general procedure well known to those skilled in the art: a first phase of thermomechanical working or kneading (sometimes referred to as "non-productive" phase) at high temperature, up to a maximum temperature of between 130° C. and 200° C., preferably between 145° C. and 185° C., followed by a second phase of mechanical working (sometimes referred to as "productive" phase) at a lower temperature, typically less than 120° C., for example between 60° C. and 100° C., during which finishing phase the crosslinking or vulcanization system is incorporated.

According to one preferential embodiment of the invention, all the base constituents of the compositions of the invention, with the exception of the vulcanization system, are incorporated intimately, by kneading, during the "non-productive" first phase, that is to say at least these various base constituents are introduced into the mixer and thermomechanically kneaded, in one or more steps, until the maximum temperature of between 130° C. and 200° C., preferably between 145° C. and 185° C., is reached.

According to one preferential embodiment of the invention, the plasticizing hydrocarbon resin and also the base constituents of the compositions of the invention, with the exception of the vulcanization system, in particular, where appropriate, the inorganic filler such as silica, are incorporated into the diene elastomer and the carbon black which have been previously prepared in the form of a first masterbatch.

Preferentially, this first masterbatch is produced in the "liquid" phase. To do this, the process involves the diene elastomer in latex form, which is in the form of elastomer particles dispersed in water, and an aqueous dispersion of the carbon black, that is to say a filler dispersed in water, commonly referred to as "slurry". Even more preferentially, the process steps described in document U.S. Pat. No. 6,048,923 will be followed, which process consists in particular in incorporating a continuous stream of a first fluid consisting of the elastomer latex into the mixing zone of a coagulation reactor, in incorporating a second continuous stream of a second fluid consisting of the aqueous dispersion of carbon black under pressure into the mixing zone to form a mixture with the elastomer latex; the mixing of these two fluids being sufficiently energetic to make it possible to almost completely coagulate the elastomer latex with the carbon black before the outlet orifice of the coagulation reactor, and then in drying the coagulum obtained.

According to another preferential embodiment of the invention, the inorganic filler and the second elastomer are incorporated into the first masterbatch while being likewise in the form of a second masterbatch that will have been prepared beforehand. This second masterbatch can be prepared in particular in solid form by thermomechanical kneading of the second elastomer and the inorganic filler; it can also be prepared by any other process, and in particular it can also be prepared in the liquid phase.

It will be noted in particular that, in the case of the incorporation of a second elastomer and/or of an inorganic filler, this or these incorporation(s) can be carried out simultaneously with the introduction into the mixer of the other constituents (in particular the first diene elastomer or first masterbatch) but also advantageously that this or these incorporation(s) may be offset in time by a few tens of seconds to a few minutes. It will be noted that, in the case of an addition of an inorganic filler and of a second elastomer, they may be introduced separately or in the form of a second masterbatch containing the second elastomer and the inorganic filler. In the case of the introduction of the second elastomer alone and of the inorganic filler alone, offset in time by a few tens of seconds to a few minutes, the inorganic filler may be introduced before, after or simultaneously with the second elastomer.

By way of example, the (non-productive) first phase is carried out in a single thermomechanical step during which all the necessary constituents (where appropriate in the form of a masterbatch as specified previously), the optional supplementary covering agents or processing aids and various other additives, with the exception of the vulcanization system, are introduced into an appropriate mixer, such as a standard internal mixer. The total duration of the kneading, in this non-productive phase, is preferably between 1 and 15 min. After cooling of the mixture thus obtained during the non-productive first phase, the vulcanization system is then incorporated at low temperature, generally in an external mixer such as an open mill; everything is then mixed (productive phase) for a few minutes, for example between 2 and 15 min.

The crosslinking system is preferentially a vulcanization system, i.e. a system based on sulphur (or on a sulphur donor) and on a primary vulcanization accelerator. Added to this base vulcanization system are various known secondary vulcanization accelerators or vulcanization activators, such as zinc oxide, stearic acid or equivalent compounds, or guanidine derivatives (in particular diphenylguanidine), incorporated during the non-productive first phase and/or during the productive phase, as described subsequently.

The sulphur is used at a preferential content of between 0.5 and 12 phr, in particular between 1 and 10 phr. The primary vulcanization accelerator is used at a preferential content of between 0.5 and 10 phr, more preferentially between 0.5 and 5.0 phr.

Use may be made, as (primary or secondary) accelerator, of any compound capable of acting as accelerator for the vulcanization of diene elastomers in the presence of sulphur, in particular accelerators of the thiazole type, and also derivatives thereof, and accelerators of thiuram or zinc dithiocarbamate type. These accelerators are, for example, selected from the group consisting of 2-mercaptobenzothiazyl disulphide (abbreviated to "MBTS"), tetrabenzylthiuram disulphide ("TBZTD"), N-cyclohexyl-2-benzothiazyl sulphenamide ("CBS"), N,N-dicyclohexyl-2-benzothiazyl sulphenamide ("DCBS"), N-(tert-butyl)-2-benzothiazyl sulphenamide ("TBBS"), N-(tert-butyl)-2-benzothiazyl sulphenimide ("TBSI"), zinc dibenzyldithiocarbamate ("ZBEC") and mixtures of these compounds.

The resulting final composition is then calendered, for example in the form of a sheet or slab, in particular for laboratory characterization, or else extruded in the form of a rubber profiled element that can be used, for example, as a tire tread for a passenger vehicle, a heavy goods vehicle, etc.

III EXAMPLES

The examples illustrate the improvement in the properties in terms of processability and properties at break of rubber compositions in accordance with the invention compared with control rubber compositions which differ from the compositions of the invention either through the CTAB specific surface area of the carbon black, or through the absence of plasticizing hydrocarbon resin, or finally through the poor dispersion (Z score) of the carbon black in the composition.

Some of the rubber compositions which follow were prepared from a masterbatch, produced in the liquid phase, of natural rubber and of carbon black, and others were prepared by mixing in the solid phase.

Preparation of Masterbatch of Natural Rubber and Carbon Black

The masterbatches of diene elastomer and carbon black used in some of the compositions which follow are produced in the liquid phase according to the process described in U.S. Pat. No. 6,048,923.

Thus, masterbatches are prepared, according to the protocol explained in detail in the abovementioned patent, from respectively carbon black N234 and carbon black N134 sold by the company Cabot Corporation, and from natural rubber field latex originating from Malaysia and having a rubber solid content of 28% and an ammonia content of 0.3%.

Masterbatches A of natural rubber and carbon black (with the N234 carbon black or the N134 carbon black) are thus obtained in which the content of carbon black is 50 phr.

Preparation of the Rubber Compositions

The control compositions TM are produced according to a conventional process for mixing in solid form in which the elastomer, therefore natural rubber in these examples, and the reinforcing filler, respectively according to the compositions: N234 carbon black and N134 carbon black, sold by the company Cabot Corporation.

The control rubber compositions CA are produced from the masterbatch A (including N234 carbon black or N134 carbon black).

The various compositions are produced in the following way:

The tests below are carried out in the following way: introduced into an internal mixer, filled to 70%, and the initial vessel temperature of which is approximately 90° C., are the natural rubber in solid form and the carbon black for the TM compositions or the masterbatch A for the CA compositions, and the various other ingredients with the exception of the vulcanization system. Thermomechanical working (non-productive phase) is then carried out in one step (total duration of the kneading equal to approximately 5 min), until a maximum "dropping" temperature of approximately 165° C. is reached.

The resulting mixture is recovered and cooled and then the vulcanization system (sulphur and sulphenamide accelerator) is added in an external mixer (homofinisher) at 70° C., by mixing the whole mixture (productive phase) for approximately 5 to 6 min.

The resulting compositions are then calendered either in the form of slabs (thickness of 2 to 3 mm) or thin sheets of rubber for the measurement of their physical or mechanical properties, or in the form of profiled elements that can be used directly, after cutting and/or assembly to/at the desired dimensions, for example as semi-finished products for tires, in particular as tire treads.

3 Tests

The rubber composition TM1 is prepared "in bulk" from natural rubber and carbon black in solid form as described in detail in section III-2; the compositions CA1 and CA2 not in accordance with the invention and the compositions CA3 to CA5 in accordance with the invention are prepared from the masterbatches A according to the process described in detail in section III-2.

All of the compositions, whatever the manufacturing process, have the following base formulation (in phr)

| | |
|---|---|
| natural rubber | 100 |
| 6PPD (a) | 1.5 |
| stearic acid | 2 |
| zinc oxide (c) | 3 |
| accelerator (d) | 1.4 |
| sulphur | 1.4 |

(a) N-1,3-dimethylbutyl-N-phenyl-para-phenylenediamine ("Santoflex 6-PPD" from the company Flexsys);
(c) zinc oxide (industrial grade - from the company Umicore);
(d) N-cyclohexyl-2-benzothiazyl sulphenamide ("Santocure CBS" from the company Flexsys).

In addition to these constituents, the TM and CA compositions differ from one another by virtue of their Z score, the nature of the carbon black and the nature and presence of plasticizing resin, and also its content, as described in detail in table 1 below.

TABLE 1

| Compositions | TM1 | CA1 | CA2 | CA3 | CA4 | CA5 |
|---|---|---|---|---|---|---|
| Carbon black (1) | — | 50 | — | — | — | — |
| Carbon black (2) | 50 | — | 50 | 50 | 50 | 50 |
| Resin (3) | 10 | 10 | — | 10 | — | 20 |
| Resin (4) | — | — | — | — | 10 | — |
| Z score | 40 | 79 | 86 | 88 | 86 | 87 |

(1) N234 sold by the company Cabot Corporation (CTAB 115 m$^2$/g)
(2) N134 sold by the company Cabot Corporation (CTAB 135 m$^2$/g)
(3) polylimonene resin ("OPPERA373N" from the company Exxon - Tg = 44° C.)
(4) polylimonene resin ("SYLVAATRAXX4101" from the company Arizona - Tg = 72° C.)

The properties measured before and after curing at 150° C. for 40 minutes are given in table 2 below.

TABLE 2

| Compositions | TM1 | CA1 | CA2 | CA3 | CA4 | CA5 |
|---|---|---|---|---|---|---|
| Properties before curing | | | | | | |
| Mooney | 77 | 58 | 71 | 56 | 57 | 44 |

TABLE 2-continued

| Compositions | TM1 | CA1 | CA2 | CA3 | CA4 | CA5 |
|---|---|---|---|---|---|---|
| Properties after curing | | | | | | |
| Stress at break at 60° C. (MPa) | 64.9 | 58.1 | 49.8 | 65.1 | 67.8 | 66.2 |
| Elongation at break at 60° C. (%) | 287 | 263 | 180 | 250 | 252 | 280 |
| Energy at break | 186 | 153 | 91 | 163 | 171 | 185 |
| tan $(\delta)_{max}$ | 0.12 | 0.11 | 0.12 | 0.11 | 0.11 | 0.09 |

It is noted that the compositions CA3, CA4 and CA5 in accordance with the invention, having a high Z score (greater than or equal to 70), and also a black having a CTAB greater than or equal to 130 m²/g and a plasticizing hydrocarbon resin in accordance with the invention (with a different resin nature and different contents), make it possible, surprisingly, to notably improve the processability of the composition (lower Mooney value) compared with a control composition TM1, without degrading the properties at break (stress, elongation, energy), contrary to the composition CA1 (comprising a carbon black with a CTAB specific surface area of less than 130 m²/g) which improves the processability but degrades the properties at break and contrary to the composition CA2 which has degraded properties at break and an inferior processability (equivalent to TM1).

Thus, it is observed that it is this specific compromise of dispersion of the filler in the elastomeric matrix, of nature of the filler and of presence of plasticizing hydrocarbon resin which surprisingly makes it possible to produce an improvement in the processability of the composition without degrading the other properties of the mixture.

The invention claimed is:

1. A rubber composition comprising the reaction products of:
   a first master batch comprising a mixture obtained, in a liquid phase, of at least one diene elastomer and a reinforcing filler comprising at least carbon black having a CTAB specific surface area greater than or equal to 130 m²/g, wherein said carbon black is dispersed in said first master batch such that a dispersion of said carbon black in said first master batch has a Z score greater than or equal to 80;
   a plasticizing hydrocarbon resin, having a glass transition temperature, Tg, which is greater than 20° C. and a softening point which is less than 170° C.; and
   a crosslinking system,
   wherein said reinforcing filler is dispersed in said rubber composition such that a dispersion of said reinforcing filler in said rubber composition has a Z score greater than or equal to 70.

2. A rubber composition according to claim 1, wherein said plasticizing hydrocarbon resin content ranges from greater than 5 parts per hundred parts by weight of elastomer (phr) to less than 25 phr.

3. The composition according to claim 1, wherein said first masterbatch is obtained from a mixture, in a liquid phase, of at least one diene elastomer latex and an aqueous dispersion of said carbon black.

4. The composition according to claim 3, wherein said first masterbatch is a dried coagulum of the mixture, in a liquid phase, of at least one diene elastomer latex and an aqueous dispersion of said carbon black.

5. The rubber composition according to claim 1, wherein said diene elastomer is selected from the group consisting of polybutadienes, natural rubber, synthetic polyisoprenes, butadiene copolymers, isoprene copolymers and blends of these elastomers.

6. The rubber composition according to claim 5, wherein said diene elastomer is a natural rubber.

7. The rubber composition according to claim 1, wherein said reinforcing filler comprises at least one inorganic filler, and further comprising at least a second elastomer.

8. The rubber composition according to claim 7, wherein said carbon black is present in an amount of from 20 to 80 phr, and said inorganic filler is present in an amount of from 5 to 50 phr.

9. The rubber composition as recited in claim 7, wherein said inorganic filler and said second elastomer are combined in a second master batch in solid form by thermomechanical kneading prior to addition of said second master batch into said first master batch.

10. The rubber composition according to claim 1, wherein a total amount of said reinforcing filler ranges from 30 to 150 phr.

11. A finished or semi-finished article comprising a rubber composition according to claim 1.

12. A tire tread comprising a rubber composition according to claim 1.

* * * * *